Aug. 19, 1941.  C. H. ROBERTS  2,252,982
APPARATUS FOR CONDITIONING AIR
Filed Feb. 1, 1939
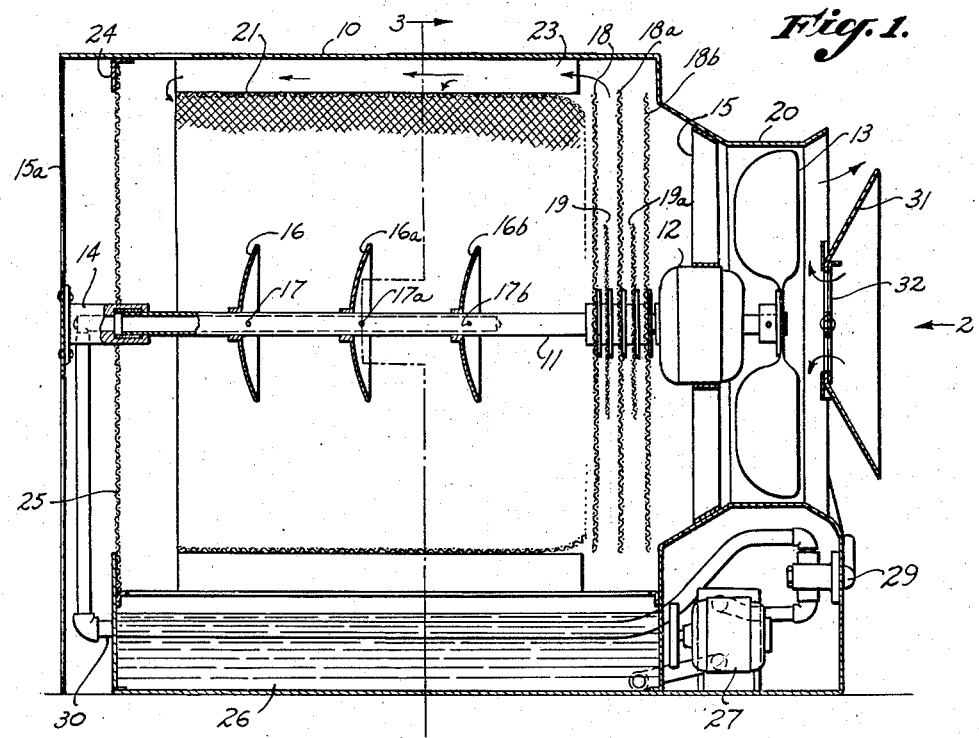
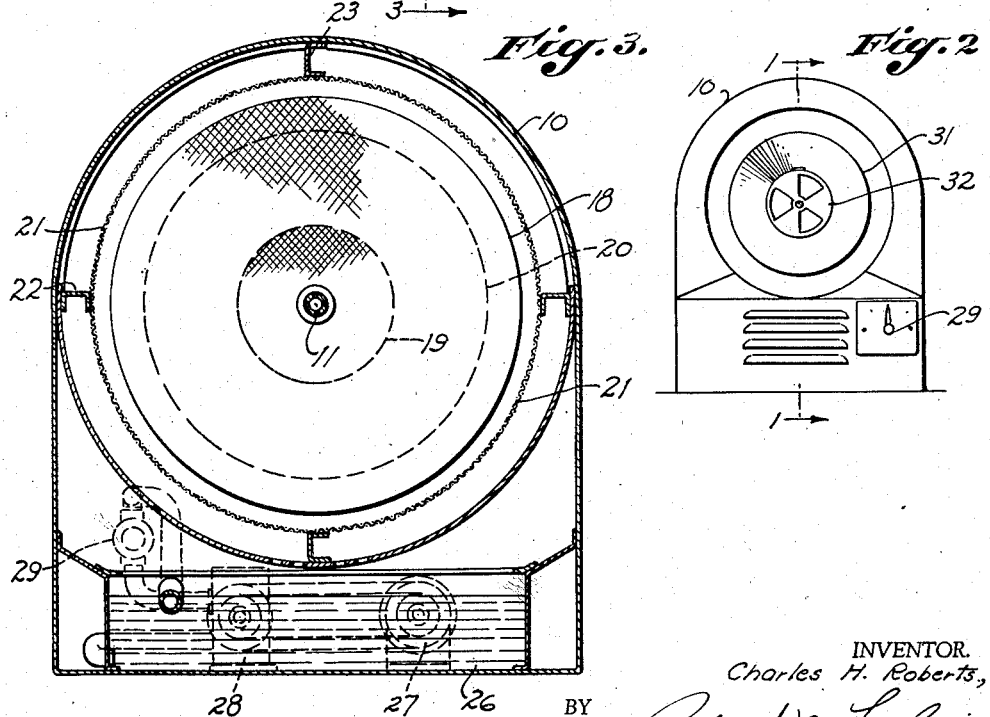
INVENTOR.
Charles H. Roberts,
ATTORNEY.

Patented Aug. 19, 1941

2,252,982

UNITED STATES PATENT OFFICE 2,252,982

APPARATUS FOR CONDITIONING AIR

Charles H. Roberts, Burbank, Calif., assignor, by direct and mesne assignments, of one-third to Edward D. Feldman, Glendale, Calif., one-third to Alan C. Stoneman, Los Angeles, Calif., and one-third to Harry W. Greenberg, Glendale, Calif.

Application February 1, 1939, Serial No. 254,017

4 Claims. (Cl. 183—21)

My invention relates generally to the conditioning of air, and more particularly to the cooling of air by evaporative means.

In the past, it has been customary in cooling the air in homes, small offices, etc., by evaporative means, to employ porous pads, usually made of excelsior, or the like, as a means of permitting the entrant air to come into intimate contact with water and to be cooled by the evaporation thereof. While these coolers have reduced the temperature of the air, they have done so at the expense of the absolute humidity of the air, as measured by its wet-bulb temperature; and as a result, the air so cooled has become oppressively moist. In addition, the moist pads have furnished an excellent breeding place for bacteria and other micro-organisms; and after the pads have been in use for a time, they often develop a very unpleasant odor.

It is an object of my invention to provide an apparatus for cooling air by the evaporation of water without appreciably, if at all, raising the wet-bulb temperature of the conditioned air.

It is another object of my invention to do this so efficiently that very little water is required for the proper and successful operation of my method and apparatus.

It is also an object of my invention to provide a cooler which may be made entirely of metal, and may therefore be easily cleaned, thus eliminating the chance for unpleasant odors, such as are associated with the present pad-type evaporative coolers.

It is also an object of my invention to provide a cooler that is quiet in operation, simple in design, and economical to manufacture.

These and other objects of my invention will become apparent from the following description of a preferred and a modified form of my invention, and from the drawing illustrating those forms, in which:

Fig. 1 is a vertical cross-sectional view taken along the axis of the cooler as shown at 1—1 in Fig. 2, Fig. 2 is an end elevation showing the discharge end of the cooler, Fig. 3 is a cross-sectional view taken at 3—3 in Fig. 1.

Referring now to the drawing, and particularly to Fig. 1 thereof, the numeral 10 indicates a housing made of sheet metal or other suitable material, preferably made cylindrical in shape. One end of the housing 10 is restricted to form a discharge duct 20, and within this discharge duct, I prefer to mount a fan 13 driven by a motor 12. The motor 12 and fan 13 are held by a support 15 mounted within the duct 20 and designed to create a minimum of friction or turbulence in air passing around it. A similar support 15a, at the opposite or intake end of the housing 10, carries a bearing 14 which supports one end of a shaft 11. This shaft 11 is the same shaft on which the motor 12 and the fan 13 are mounted, and the bearings of the motor support the other end of the shaft, near the discharge end of the housing 10. The shaft 11 is hollow for a portion of its length, extending from the bearing 14, and means are provided for forcing water through the bearing and into the shaft. Mounted along the hollow portion of the shaft 11 are a series of discs 16, 16a, and 16b which I term centrifuges and which are attached to the shaft so that they rotate with it. While I have shown these centrifuges 16, 16a, and 16b as segments of a sphere, they may be made in the form of cones, truncated cones, or any other convenient shape, so long as a concave surface is provided. On the concave side of each of the discs 16, 16a, and 16b, adjacent the point of attachment of the disc to the shaft 11, a plurality of perforations 17, 17a, and 17b are provided in the shaft, so that jets of water will flow out from the shaft, impinge upon the disc, where they will be carried by centrifugal force to the edge of the disc and there thrown off substantially as a sheet. The spray thus produced should preferably be paper-thin, and to assist in achieving this, the edges of the discs 16, 16a, and 16b are finished to a knife edge. Since the size of the perforations 17, 17a, and 17b does not determine the thickness of the spray, they may be made large enough to prevent their clogging up when used with water containing a large amount of dissolved or finely divided solids. While I have shown three discs or centrifuges 16, 16a, and 16b mounted on the shaft 11, it is to be understood that the number may be varied. One disc and its associated spray will produce a certain amount of cooling and washing, and each additional disc will provide more; but a point is soon reached where the addition of more discs is not justified.

Between the disc 16b and the discharge duct 20, I have provided rotating screens 18, 18a, and 18b, covering the entire area of the outlet duct, and preferably projecting beyond it, and smaller rotating screens 19 and 19a covering the central area of the duct. The screens 18, 18a, 18b, 19, and 19a, which I term moisture eliminators, are mounted on the shaft 11 so that they rotate with it, and their action is to intercept the flow of air passing through the apparatus, collect the moisture entrained in that air, and remove it from the path of the air by means of centrifugal force. Since the peripheral speed of the smaller screens 19 and 19a will be much lower than that of the larger screens 18, 18a, and 18b, the smaller screens are made of a finer mesh screening than the larger ones, so that both sets will intercept the flow of air at approximately equal rates.

While I have shown separate screens of different mesh because they are readily available, it will be evident that a spider-web type of screen may be used in which the openings are small at the center and graduate to larger openings at the outside. If this is done, the number of moisture eliminators may be reduced.

When the water is thrown outwardly by the eliminators 18, 18a, 18b, 19, and 19a, a certain amount of air is thrown with it; and to provide a passageway for this air, a fine screen cylinder 21 is disposed within the housing 10 concentric with the shaft 11, and held in place by supports 22 and 23, which I prefer to make in the form of longitudinal channels, so that air may pass between them with a minimum friction and turbulence. The screen cylinder 21 extends from a point adjacent the eliminators 18, 18a, 18b, 19, and 19a to a point adjacent the entrance end of the housing 10. Between the intake end of the screen cylinder and the intake end of the housing 10, I have provided a baffle 24 which I prefer to make in the form of a metal plate with a circular opening in it approximately the same size as the diameter of the screen cylinder and aligned with the latter. A screen 25 over the opening in the baffle 24 prevents any water from being blown out through the intake end of the apparatus. It is to be understood that when in the claims I use the term "cylinder," I do not mean to limit myself to a truly cylindrical surface, but mean to include all usable variations thereof, such as polygonal surface tubes and the like.

In the bottom of the housing 10, I have provided a tank 26 of sufficient capacity to hold enough water to operate the device for an extended period of time. A pump 28, driven by a motor 27, forces water from the tank 26 through a valve 29 and thence through piping 30 to the bearing 14, where it enters the hollow portion of the shaft 11. The pump 28 and motor 27 may be formed as a single unit or may be separate, but I prefer to have the pump and fan driven by different motors, and controlled by separate switches. The valve 29 may be of any convenient type adapted to regulate the flow of water to the centrifuges 16, 16a, and 16b.

While the fan 13 may be mounted at either the intake or discharge end of the apparatus, I prefer to mount it at the discharge end and provide a frustro-conical deflector 31 disposed concentrically with the discharge duct 20 at its exit end. The deflector 31 is displaced along the axis of the housing 10, so that the air being discharged is forced out around it. The center of the cone is closed by a plate having a series of variable openings 32 in it which may be adjusted to permit air to be drawn through the center of the deflector into the air stream and thereby discharged around the reflector.

In the operation of my apparatus, air is drawn in through the intake end through the screen 25 and passes into the screen cylinder 21, where it passes through the three water sprays formed by the centrifuges 16, 16a, and 16b which wash the air and cool it by evaporation. The sprays impinge on the screen cylinder 21 and pass on through it to hit the housing 10, and then drain back into the tank 26. The air next passes through the spray eliminators 18, 18a, 18b, 19, and 19a where the water added by the spray is removed by centrifugal force. In removing the water, a portion of the air which would normally pass on through the apparatus is thrown radially toward the outside of the housing, along with the water, and this air, having been cooled and washed, is passed back or recirculated around the screen cylinder 21 where it aids in cooling the incoming air. This cooling by the recirculated air is effected to a small degree by conduction and radiation, but mainly by the mixing and intermingling of the cooler, recirculated air with the warmer entering air as the recirculated air passes through the screen cylinder 21 into the path of the entering air. Any of the recirculated air which has not passed through the screen cylinder 21 is deflected by the baffle 24 at the intake end of the cylinder and there mixes with the entering air. I have found that a minimum of about 20% of the air passing through the cylinder 21 should be recirculated in this manner for the most efficient operation of my invention. Passing on through the duct 20, the air is deflected radially by the frustrum 31, so that if the apparatus is placed in a room, a person standing directly in front of it will not have a direct stream of air flowing upon him.

By opening the apertures 32, air may be drawn from the room into the outlet end of the apparatus, and discharged with the conditioned air; in this way, constant circulation of air in the room may be obtained with a minimum of drafts. The valve 29 controls the amount of water discharged through the spray, and hence controls the amount which the air is cooled; thus, if it is desired to use the apparatus to force air into a room without washing or cooling the air, the valve 29 may be turned to its closed position, and the air will be forced through the apparatus without passing through any sprays.

The water thrown out by the moisture eliminators 18, 18a, 18b, 19, and 19a drains back into the tank 26, and is recirculated by the pump 27, while the screen 25 prevents any of the spray in the cylinder from being blown back out of the machine. By these means, nearly all of the water used in the apparatus is conserved, and a very small amount of water is necessary for the proper and successful operation of the apparatus. The temperature of the water placed in the tank 26 may be higher than that of the entering air; but immediately upon starting the apparatus, the water is cooled until it reaches the wet-bulb temperature of the air.

By way of example only, the following data are given as an indication of the performance that may be expected from one particular size unit of my invention:

| | |
|---|---|
| Inner diameter of outer shell 10 | inches 24 |
| Diameter of screen cylinder 21 | do 20 |
| Diameter of centrifuges 16, 16a, and 16b | do 6 |
| Diameter of duct 20 | do 18 |
| Mesh of the large eliminators 18, 18a and 18b | mesh 16 |
| Mesh of the small eliminators 19 and 19a | mesh 30 |

Performance data:
  Intake:
    Dry-bulb temperature _____ 80° F.
    Wet-bulb temperature _____ 56° F.
  Discharge:
    Dry-bulb temperature _____ 58° F.
    Wet-bulb temperature _____ 56° F.±
  Volume of air _____ 2000 c. f. m.

While I have shown and described a preferred and a modified form of my invention, it will be apparent that minor deviations may be made from these descriptions and drawing without in any way departing from the spirit of my invention as defined in the appended claims.

I claim as my invention:

1. A device for washing and cooling air which includes: a housing; a screen cylinder within said housing and concentric and forming an annular passage therewith adapted to allow recirculation of a portion of said treated air; means for inducing a flow of air through said screen cylinder; a rotating disc upon which jets of water play to produce a water spray at a substantial angle to the axis of said cylinder; a rotating screen adjacent the discharge opening of said housing and through which said air must pass; a peripheral baffle approximately perpendicular to the flow of said air, located between said screen cylinder and the entrant end of said housing, and extending from said housing to a point substantially in line with said screen cylinder; a tank; means for conducting water from said tank to said rotating disc; and means for controlling the amount of water conducted to said rotating disc.

2. A device as described in claim 1 in which said means for inducing a flow of air is a fan mounted at the outlet end of said device, and said device is provided with a deflector in the form of a hollow truncated cone provided with variable apertures at its center.

3. A device for washing and cooling air which includes: a housing; a cylinder within said housing and forming an annular passage therewith adapted to allow recirculation of a portion of the treated air; means for inducing a flow of air through said cylinder; a rotating disc upon which jets of water play to produce a water spray at a substantial angle to the axis of said cylinder; a rotating screen adjacent the discharge opening of said housing and through which air must pass; a peripheral baffle located between said cylinder and the entrant end of said housing and extending radially inwardly in said housing; a tank; and means for conducting water from said tank to said rotating disc.

4. A device for washing and cooling air which includes: a housing; a screen cylinder within said housing and forming an annular passage therewith adapted to allow recirculation of a portion of the treated air; means for inducing a flow of air through said cylinder; means for producing a water spray at a substantial angle to the axis of said cylinder; a rotating screen adjacent the discharge opening of said housing and through which air must pass; a peripheral baffle located between said cylinder and the entrant end of said housing and extending radially inwardly in said housing; a tank; and means for conducting water from said tank to said spray means.

CHARLES H. ROBERTS.